W. L. ROSS.
FROST PREVENTING DEVICE FOR ORCHARDS.
APPLICATION FILED JAN. 10, 1920.
1,389,989.
Patented Sept. 6, 1921.
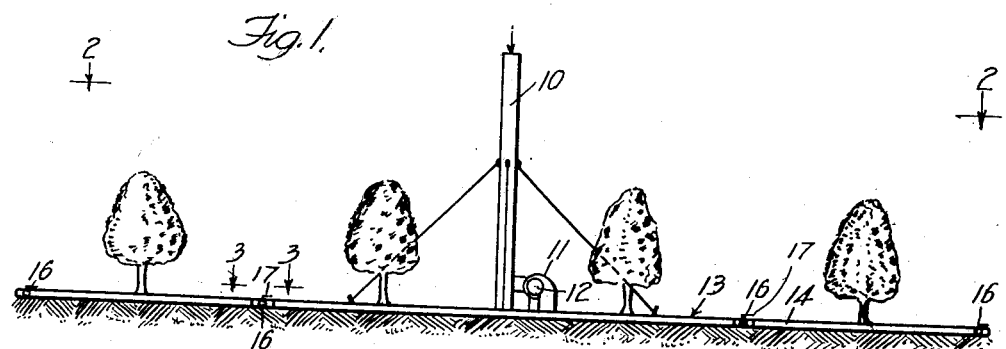
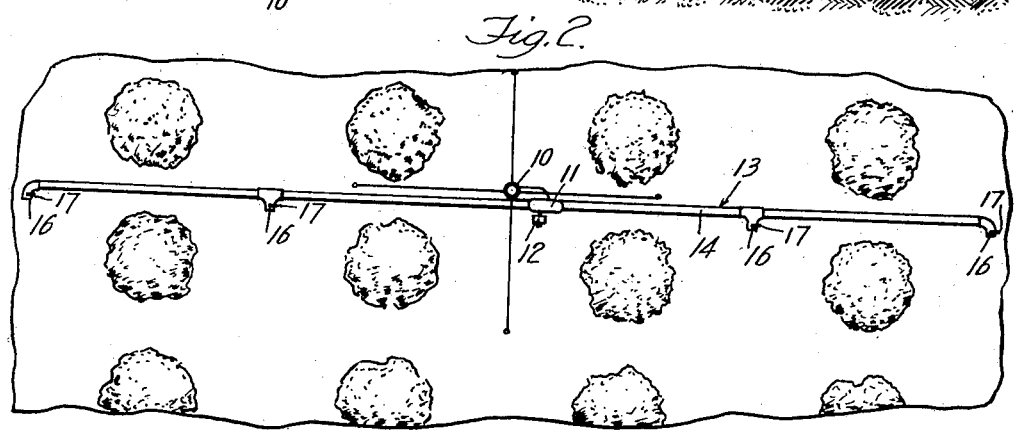
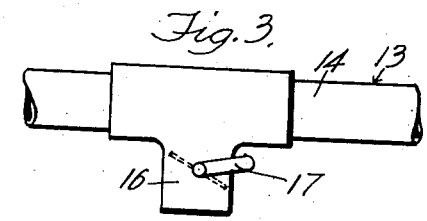
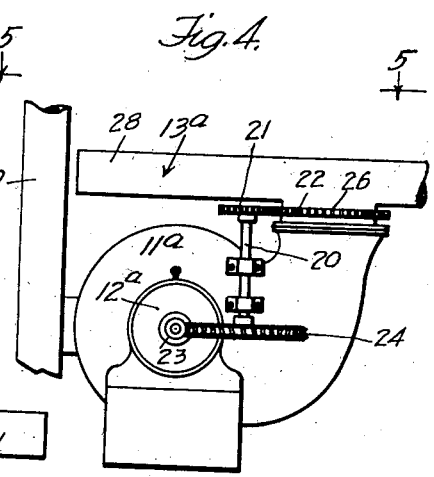
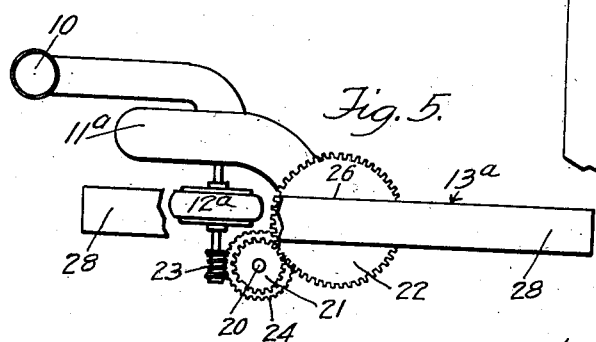
Inventor:
William L. Ross.
by
his Attorney.

UNITED STATES PATENT OFFICE.

WILLIAM L. ROSS, OF PORTERVILLE, CALIFORNIA.

FROST-PREVENTING DEVICE FOR ORCHARDS.

1,389,989.  Specification of Letters Patent.  Patented Sept. 6, 1921.

Application filed January 10, 1920. Serial No. 350,679.

*To all whom it may concern:*

Be it known that I, WILLIAM L. ROSS, a citizen of the United States, residing at Porterville, in the county of Tulare, State of California, have invented new and useful Improvements in Frost-Preventing Devices for Orchards, of which the following is a specification.

This invention relates to a process and apparatus for preventing frost or for protecting against frost, and more particularly to such a process and apparatus for orchards or like plantations. An object of the invention is to provide an effective process for preventing or protecting against frost and to provide a simple, inexpensive and effective apparatus for carrying out the process.

It is well known to fruit growers that trees in valleys or comparatively low places become frost bitten before and more severely than trees which are on hills or comparatively high places and that the lower portions of the trees become frost bitten before and more severely than the upper portions of the trees. The reason for this is because there is less circulation of air in valleys and low places and around the lower portions of the trees than there is at high places and around the tops of the trees. The hills and high places shelter and protect the valleys and low places allowing cold air to settle into them. The trees, plants or shrubs, as the case may be, tend to and do materially check or stop the circulation of air; the air near the ground and around the lower portions of the trees being pratically motionless unless there is a wind to agitate it. Generally, in fact practically always, the air above the trees and at the high portion of the orchard or plantation is circulating and, due to the fact that the coldest air settles into the valleys or low portions, it is warmer than the air in the lower portions of the orchard and around the lower portions of the trees. If frost is allowed to form on trees such as citrus trees the fruit is frozen and often the trees are killed. By the present invention the air in the low portions of an orchard and the air around the lower portions of the trees, and in and among the trees, may be kept in circulation and kept warm, thereby preventing the formation of frost due to still cold air.

The process provided by the invention, broadly speaking, consists of taking air from an altitude where it is in circulation and comparatively warm, and discharging or distributing such air near the ground to displace and cause circulation of the cold still air near the ground and around the lower portions of the trees.

The apparatus provided for carrying out the process comprises a stand pipe or vertically arranged casing the upper end of which is considerably above the tops of the trees, in fact is at an altitude or elevation where the air is in circulation and the upper strata of air is comparatively warm. Means is provided for drawing the air down through the stand pipe or casing to a suitable distributer which discharges or delivers it into the cold still air near the ground and around the lower portions of the trees. Warm air from a higher altitude being forced into the cold air near the ground starts or causes circulation of that air and warms it. In practice the air brought down from the high altitude is not sufficiently warm to rise immediately or rapidly but circulates through and mingles with the lower colder air, warming it and displacing it.

Although the invention is herein set forth as applied to an orchard and trees it will be understood that it is not in any way limited or restricted to use in connection with an orchard or trees but that it may be advantageously applied to plantations or gardens of vegetation or plant life of any kind. For the sake of simplicity and clearness the words orchard and trees will be used to refer to any planting, garden or plantation and any plants, bushes or other vegetation, respectively.

In order to set forth the invention in a clear and intelligible manner I will proceed with a detailed description of the invention throughout which reference is had to the accompanying drawings, in which—

Figure 1 is a side elevation of an apparatus embodying the invention; Fig. 2 is a plan view of the apparatus shown in Fig. 1 being a view taken as indicated by line 2—2 on Fig. 1; Fig. 3 is an enlarged view taken as indicated by line 3—3 on Fig. 1 showing in detail a portion of the distributing apparatus; Fig. 4 is a side elevation of the lower portion of another form of apparatus embodying the invention; and Fig. 5 is a plan view taken as indicated by line 5—5 on Fig. 4.

Throughout the drawings numeral 10 designates a vertically extending casing or stand pipe arranged in a suitable part of the orchard. It will be understood that the size of the orchard, the size of the apparatus, the severity of the weather and the landscape or contour of the orchard determines the number and arrangement of units or apparatus required to effectively prevent the formation of frost. If the orchard is so arranged that there is naturally a continued flow or circulation of air through it in one direction it is preferred that the apparatus or plurality of apparatus, as the case may be, be arranged so that the air delivered by the apparatus will be carried or moved through the orchard by the natural flow of air rather than be arranged so that the air will be moved out of the orchard without affecting the cold air around the trees. For instance, if the wind normally comes from the north during cold spells, the apparatus will be arranged on the north side so that the air delivered by it will be carried through the orchard by the wind. The stand pipe 10 is open at its upper end and is of sufficient height to receive air in its upper end from an altitude or elevation where the air is in circulation and warmer than the air around the trees. The height of the stand pipe 10 in any particular apparatus will depend upon the portion of the orchard in which the apparatus is to be used, and the height necessary to reach a warm upper air strata. For instance, an apparatus located in an extremely low portion of the orchard may require or be more effective with a comparatively high stand pipe while an apparatus located near or at a high portion of the orchard may be effective with a comparatively low stand pipe.

Air from the upper strata into which the stand pipe extends is drawn down through the stand pipe by a suitable blower 11. The blower or device for drawing the air down through the stand pipe may be any suitable or desired device, it being understood that the invention is not limited or restricted to any particular or specific device for this use. The blower 11 may be driven in any suitable manner. For instance, it may be driven by an electric motor 12 connected directly to the blower 11 in the manner shown in the drawings.

From the blower 11 the air is delivered into the distributer 13. The distributer 13 comprises a pipe 14 extending from the blower 11 to the parts of the orchard where it is desired to deliver the air. The length and arrangement of the pipe 14 will depend upon the particular situation in which the apparatus is used and the area of orchard to be affected by the apparatus. In the particular form of the invention shown in the drawings, the pipe 14 and the blower 11 are arranged so that the blower is approximately at the center of the pipe thereby causing equal distribution to the two ends thereof.

Arranged at suitable intervals along the pipe there are discharge ports 16 provided with suitable control valves 17. The discharge ports may be so arranged along the pipe 14 and the control valves may be so regulated as to cause substantially even or uniform distribution of the air. When the apparatus is arranged in an orchard where there is a flow of air in one direction it is preferred, as above stated, that the apparatus be arranged so that the air, discharged from the apparatus, will be carried through the orchard. To properly cause such flow of the air the pipe 14 is preferably arranged transversely of the flow of air through the orchard and at the end of the orchard where the flow of air comes from.

In the form of the invention shown in Figs. 4 and 5 the air, drawn down the stand pipe by the blower 11$^a$, is distributed by a revolving distributer 13$^a$. The distributer 13$^a$ is preferably positively driven by the motor 12$^a$ which drives the blower 11$^a$. Any suitable driving connection may be arranged between the motor 12$^a$ and the distributer. For instance, a counter shaft 20, carrying a pinion 21 which engages and drives a ring gear 22 on the distributer, may be driven from the motor through a suitable worm 23 and worm wheel 24, mounted on the motor shaft and the counter shaft, respectively. It is preferred that the various members in the drive between the motor and the distributer be such as to cause the distributer to be normally driven at a speed of about one revolution per minute.

The distributer 13$^a$ is a member which is rotatably mounted at 26 on the blower 11$^a$ and which comprises a plurality of radially extending open ended discharge pipes 28. The distributer preferably comprises two discharge pipes 28, as shown in the drawings, but it will be understood that the invention is not limited in any way to such a number. Air which is drawn down the stand pipe 10 is delivered to the distributer so that it issues from the ends of the discharge pipes 28. It will be readily understood how the rotation of the distributer at about one revolution per minute causes distribution of the air equally in all directions. Such distribution of the air from the stand pipe causes circulation of air around the trees and prevents the trees from being frost bitten.

Having set forth a preferred form of my invention and as I consider my invention broad in its scope I do not wish to limit myself to the specific details hereinabove set forth but wish to reserve to myself any changes or modifications that may appear to those skilled in the art or that may fall within the scope of the following claims.

Having described a preferred form of my invention, I claim:

1. A process of protecting orchards and the like, embodying drawing warm air from the upper strata above the vegetation and displacing the colder lower strata of air near the ground below the vegetation with such warm air.

2. Apparatus for protecting orchards and the like comprising in combination, a relatively long vertically extending stack whose upper end stands in high air strata which serves as a source of air supply, means to move air down the stack and stationary air distributing means communicating with the stack at the lower end and spread over the field so as to discharge air over the surface thereof.

In witness that I claim the foregoing I have hereunto subscribed my name this 26 day of December 1919.

WILLIAM L. ROSS.

Witnesses:
F. W. VELIE,
M. E. DeWITT.